(12) United States Patent
Li et al.

(10) Patent No.: US 6,628,637 B1
(45) Date of Patent: Sep. 30, 2003

(54) SPREAD-SPECTRUM CARRIER TRANSMISSION POWER CONTROL IN WIRELESS TELECOMMUNICATIONS SYSTEMS

(75) Inventors: Huan Li, Plano, TX (US); Ping Yang, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/464,667

(22) Filed: Dec. 15, 1999

(51) Int. Cl.[7] .................................................. H04Q 7/20
(52) U.S. Cl. ........................ 370/342; 370/331; 370/332; 370/335; 455/436; 455/522
(58) Field of Search ............................. 455/69, 70, 522, 455/63, 453, 436, 450, 438, 439; 370/252, 335, 342, 230, 329, 330, 331, 332, 333, 441, 445, 447, 320, 328, 318

(56) References Cited

U.S. PATENT DOCUMENTS

| | | | | |
|---|---|---|---|---|
| 5,826,218 A | * | 10/1998 | Khafizov et al. | 702/179 |
| 5,838,671 A | * | 11/1998 | Ishikawa et al. | 370/335 |
| 5,884,174 A | * | 3/1999 | Nagarajan et al. | 455/436 |
| 6,052,583 A | * | 4/2000 | Bernardin | 455/423 |
| 6,085,106 A | * | 7/2000 | Sendonaris et al. | 455/522 |
| 6,134,423 A | * | 10/2000 | Wiedeman et al. | 455/117 |
| 6,141,565 A | * | 10/2000 | Feuerstein et al. | 455/560 |
| 6,160,999 A | * | 12/2000 | Chheda et al. | 455/69 |
| 6,181,941 B1 | * | 1/2001 | McCarthy | 455/436 |
| 6,192,243 B1 | * | 2/2001 | Yang et al. | 455/436 |
| 6,208,873 B1 | * | 3/2001 | Black et al. | 455/522 |
| 6,252,848 B1 | * | 6/2001 | Skirmont | 370/229 |
| 6,266,529 B1 | * | 7/2001 | Chheda | 455/436 |
| 6,269,239 B1 | * | 7/2001 | Hashem et al. | 455/69 |
| 6,304,755 B1 | * | 10/2001 | Tiedemann et al. | 455/437 |
| 6,349,208 B1 | * | 2/2002 | Sexton et al. | 455/439 |

* cited by examiner

*Primary Examiner*—Dwayne Bost
*Assistant Examiner*—Jean A Gelin
(74) *Attorney, Agent, or Firm*—Carr LLP

(57) ABSTRACT

A new call blocking threshold of one or more BTS forward links is adjusted to compensate for variation in traffic demand and, optionally, user mobility as well. Anticipated traffic demand from new calls and user mobility are derived from operational measurement data obtained and stored in a management and control system. The new call blocking threshold is adjusted with a frequency relating to the rate of change in traffic demand or user mobility.

42 Claims, 5 Drawing Sheets

BTS 104 CDMA FORWARD LINK FREQUENCY SPECTRUM OF CARRIER $F_1$

MEASUREMENT AND CONTROL
TIME INTERVALS

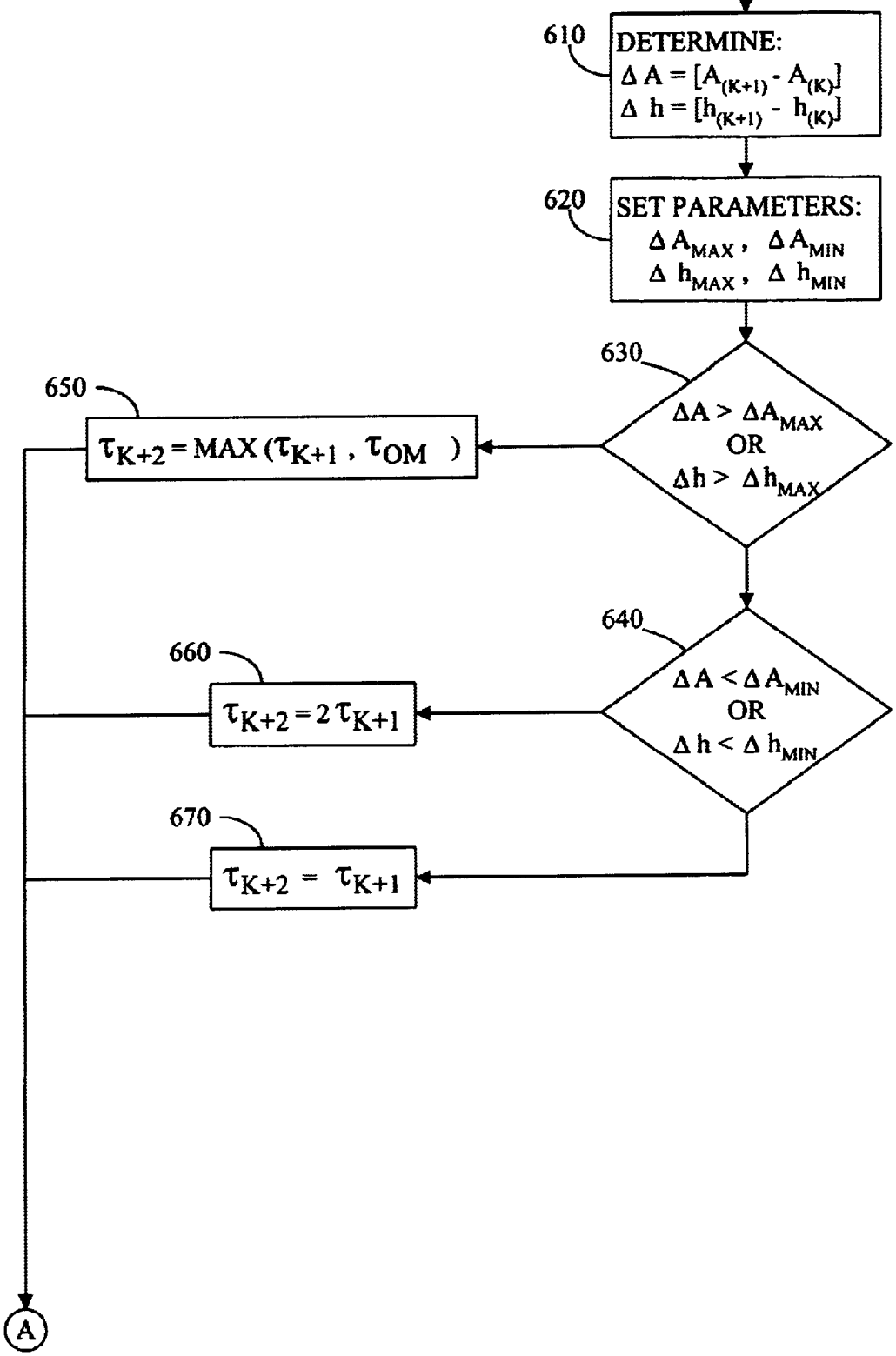

SPREAD-SPECTRUM CARRIER TRANSMISSION POWER CONTROL IN WIRELESS TELECOMMUNICATIONS SYSTEMS

TECHNICAL FIELD OF THE INVENTION

This invention relates generally to enhancement of the combined grade of service (GOS) and quality of service (QOS) in a wireless telecommunications system and, more particularly, to adjustment of one or more forward link transmission power limitation thresholds in relation to measured traffic demands on a wireless forward link.

BACKGROUND

In code division multiple access (CDMA) wireless telecommunications and similar "spread spectrum" transmission systems, transmissions are made within one or more ranges of frequencies, such as $F_1$, $F_2$, $F_3$ through $F_n$, also referred to as "carriers." In simplistic terms, individual calls within each carrier are separated and differentiated from each other by codes transmitted and detected by the respective transmission and receiving equipment handling the calls. In a mobile wireless system, such equipment is provided in the form of one or more mobile handset transceivers (MSs) and a base station transceiver (BTS) that is capable of handling calls to multiple MSs simultaneously. Transmissions from each BTS to each MS is conducted through a wireless "forward link," while transmissions from each MS to each BTS is conducted through a wireless "reverse link," In general, each call between a BTS and an associated MS thus includes a forward and a reverse link.

The traffic capacity or grade of service (GOS) and quality of service (QOS) available over each frequency band or carrier (e.g. $F_1$, $F_2$, $F_3$, through $F_n$) provided by each BTS in a CDMA or other spread spectrum system is limited. Grade of service generally refers primarily to the probability of new calls to or from the BTS being blocked, while quality of service generally refers primarily to the fidelity or integrity of sound or data transmissions.

In CDMA systems, capacity or GOS limitations are primarily imposed by forward link power transmission constraints which limit the total power available for new calls, handoffs and hand-overs over the forward link of each carrier below a maximum high power amplifier (HPA) limit of the BTS. Moreover, limitations and the QOS of the total forward link are also imposed by interference between all calls within the carrier, which increases as the total transmission power over the carrier increases to accommodate new calls, handoffs and hand-overs. Because each new call, hand-over and handoff uses an additional amount of power and capacity over the forward link of a carrier, an allocation is made of the total available power for new calls on one hand, and hand-overs and handoffs on the other hand, to provide the desired combination of GOS and QOS.

There are two thresholds for forward link power allocation to new call attempts and soft handoff attempts. Call blocking threshold is the first digital threshold as the digital power sum increases in normal operation. When the digital power sum for all channel elements of a sector is above this threshold, the BTS blocks all new call attempts for the sector. However, handoffs into the sector are still allowed to maintain existing calls. Handoff blocking threshold is the second digital threshold to be reached. If it is exceeded, the BTS blocks all further handoffs into the sector.

Both parameters are currently set empirically or, in other words, based on general experience in the field. Usually, the handoff blocking threshold is set higher than the call blocking threshold, giving handoff attempts a higher priority than new call attempts. This gives a higher priority to avoiding denial of handoff attempts, which would result in dropped calls. A lower priority is given avoiding denial of new call attempts because only a busy signal would result.

It is a common practice to empirically set the handoff blocking threshold high enough such that handoff blocking is a rare event. Moreover, it is observed that variation of the handoff blocking threshold, after it is set higher than a certain value, has negligible impact on blocked handoffs. Thus, it is preferable that the call blocking threshold is set to balance the GOS and QOS. If the call blocking threshold is set too low, the call blocking probability will be unacceptably high, because there will be too little power available for new call attempts. If the threshold is set too high, an unacceptably high probability that the actual output power will reach the maximum amount of analog transmit power allowed at the output of the HPA will result, which could cause power limiting of the sector. During power limiting, the total HPA output power is forced below its limit. Because of this sudden overall power decease, every user is punished equally with same amount of reduced power. This may cause high FER for users in the sector, call dropping and reduction of both QOS and GOS.

Currently, there is no systematic method of setting the call blocking threshold. The call blocking threshold is set empirically as a fixed value regardless of the traffic and mobility condition in a sector. The fixed threshold can not accommodate well geographic areas in which traffic and mobility demand at the busy hour (e.g., highways) and during regularly scheduled events (e.g., stadiums) swells dramatically and thus may cause either a high call blocking rate or a high probability of power limiting. The limitation of this current method of forward link power allocation unnecessarily limits the capacity and GOS of CDMA system.

In the past, the well-known Erlang-B formula has been used for estimating forward link capacity and call blocking probability in CDMA system. However, the Erlang-B formula was developed for wireline systems. It is not as predictable of CDMA system performance, since it does not take into account the variable nature of the CDMA RF environment, mobility in cellular systems, and assignment of a higher priority to handoff attempts than admission of new call attempts. The limitation of this current traffic provisioning method results in inaccuracy of CDMA system traffic and performance measurement.

It is an object of the present invention to provide a method to replace the conventional method for setting the call blocking threshold and to provide a method to replace the Erlang-B formula for traffic provisioning in CDMA systems.

SUMMARY OF THE INVENTION

These and other limitations associated with current CDMA management and control systems are overcome by the present invention, in which the new call blocking threshold of one or more BTS forward links is adjusted to compensate for variation in traffic and mobility demand, which results from new call attempts, handoff attempts, and the like. In one aspect of the invention, there is provided a method of determining call blocking probability and power limiting probability for given traffic and mobility demands and a given call blocking threshold. In yet another aspect of the invention, there is provided a method of adjusting the call blocking threshold in relation to anticipated traffic and mobility demands. In yet another aspect of the invention, anticipated traffic demand from new calls and user mobility are derived from operational measurement data obtained and stored in a management and control system. In still another aspect of the invention, the new call blocking threshold is adjusted with a frequency relating to the rate of change in traffic and mobility demand.

BRIEF DESCRIPTION OF THE DRAWINGS

For a more complete understanding of the present invention, and its advantages, reference will now be made in the following Detailed Description to the accompanying drawings, in which:

FIG. 6 is a flow diagram continuing from FIG. 5, illustrating the method of a preferred embodiment of the present invention.

DETAILED DESCRIPTION

Figure 1:
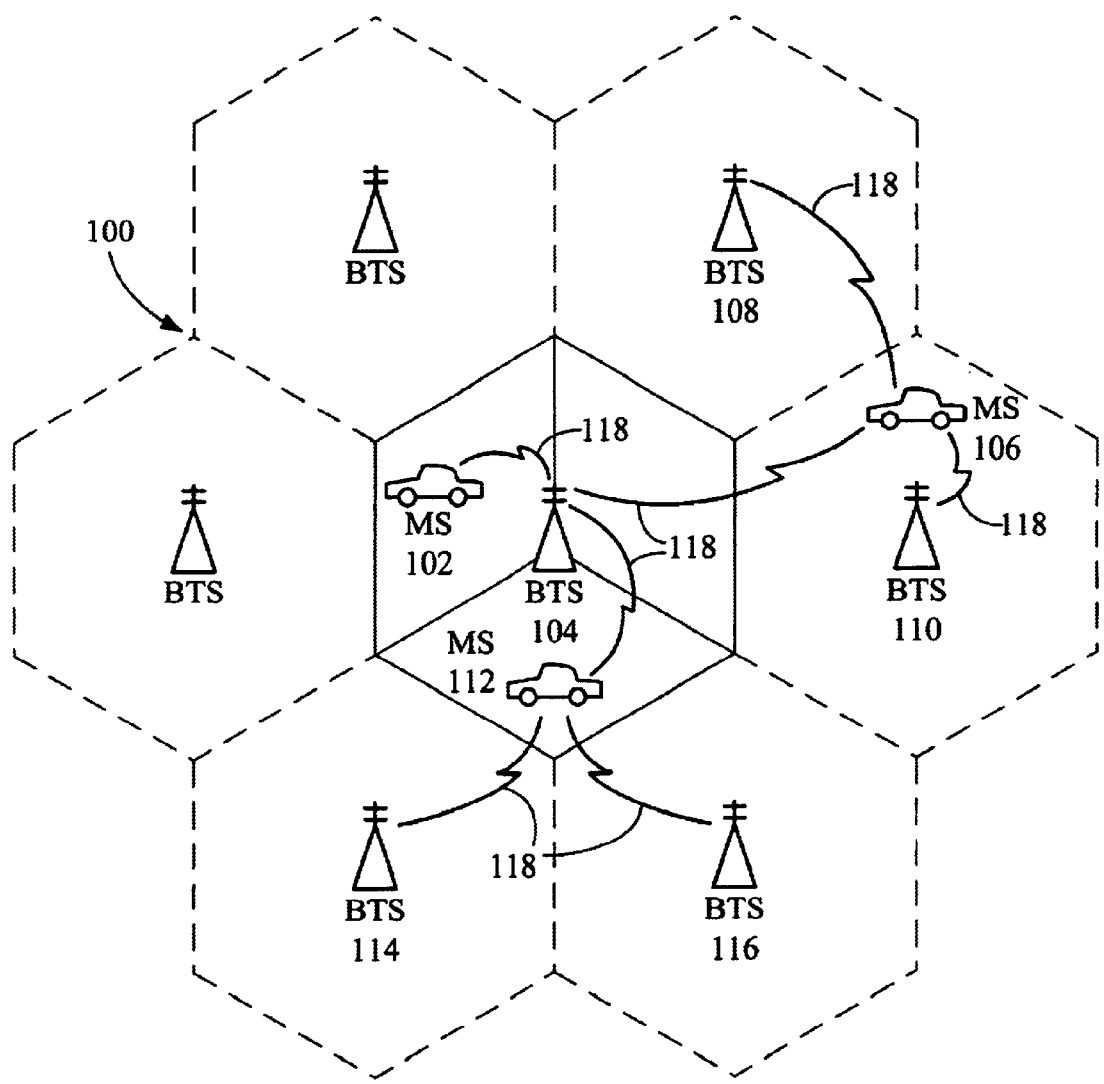
FIG. 1 is a schematic diagram of adjacent cell sites, illustrating the forward links established between a plurality of BTSs and individual MS users as they migrate between cells and sectors of a wireless CDMA telecommunications system.

Referring now to FIG. 1, there is shown a portion of a CDMA wireless telecommunications network 100. The portion of the network 100 shown includes a plurality of cells (shown in solid and broken lines), each served by a BTS. In communication with a number of the BTSs shown are a plurality of mobile users, each using an MS to engage in a telephone call or data transfer. Each wireless communications link established between each MS and one or more associated BTSs actually comprises both a forward and a reverse wireless link; however, for purposes, of simplification, only one link is shown in FIG. 1.

Each MS within the network 100 is in communication with at least one BTS at a time and is often in communication with more than one BTS simultaneously. For example, MS 102 is shown in communication with only one BTS 104, while MS 106 is shown in communication with BTSs 108 and 110 in addition to BTS 104. Similarly, MS 112 is shown simultaneously communicating with BTSs 104, 114 and 116. Both the forward and reverse links establishing the wireless communications link between each MS and any associated BTS are represented by a single wireless link 118.

There are three primary ways in which communications are established between an MS and one or more BTSs, known as a new call, soft handoff and soft hand-over. A new call occurs as the network 110 or a user seeks to originate the call from a BTS or an MS that is not previously set up. Origination of a new call is shown by the single communications link 118 between MS 102 and BTS 104. A soft handoff occurs as an MS, such as either MS 106 or 112, engages in simultaneous, continuing communication with two or more BTSs through two or more communication links 118. This technique is used to enhance the QOS of the network 100 by adding redundancy to the communications links, thereby reducing the overall bit error rates experienced during transmission., A soft hand-over occurs as an MS engages in simultaneous, but temporary, communication through two more communications links 118 as a call is transferred from one BTS to the next, as an MS travels from one cell or sector to an adjacent cell or sector. Soft handoffs can occur anytime following establishment of a new call. Moreover, soft handoffs can also occur with the same BTS as an MS establishes a communications link between two or more sectors within the cell serviced by the BTS.

Figure 2:
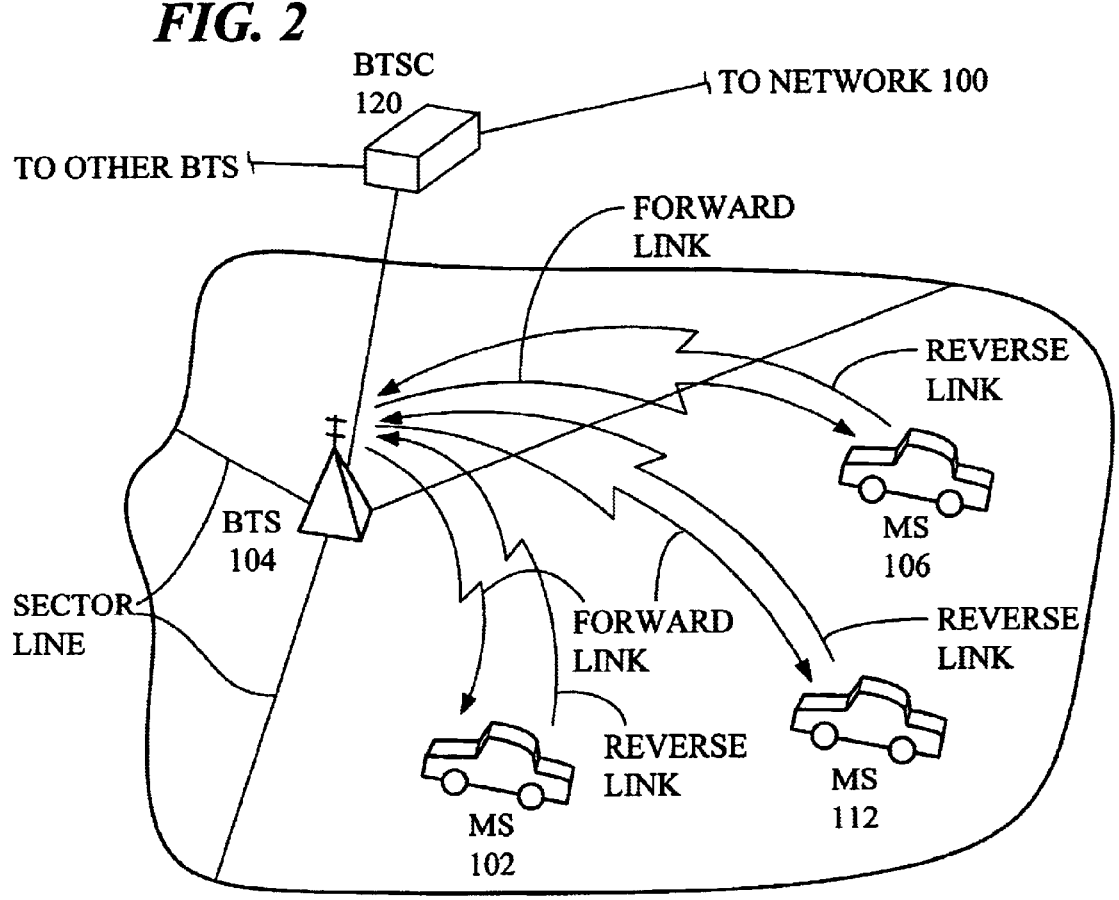
FIG. 2 is a schematic diagram, illustrating the forward and reverse links established between a BTS and a plurality of MS users, each engaged in a call serviced by the BTS.

FIG. 2 illustrates a portion of the wireless telecommunications network 100, including only in BTS 104 and MSs 102, 106 and 112. Each of the communication links 118 shown in FIG. 1 that conduct communications between BTS 104 and MSs 102, 106 and 112 includes a Forward Link and a Reverse Link. As will be apparent to those skilled in the art, each forward link transmits from the BTS 104 to each of the associated MSs 102, 106 and 112, while each Reverse Link transmits from each of the associated MSs 102, 106 and 112 to the BTS 104. The example of FIG. 2 differs from FIG. 1 in that each of the MSs 102, 106 and 112 of FIG. 2 are shown establishing a new call with the BTS 104, over the same carrier $F_1$ and within the same sector. In FIG. 1, MS 102 is shown establishing a new call to BTS 104, while MSs 106 and 112 are establishing soft handoffs with BTS 104.

Figure 3:
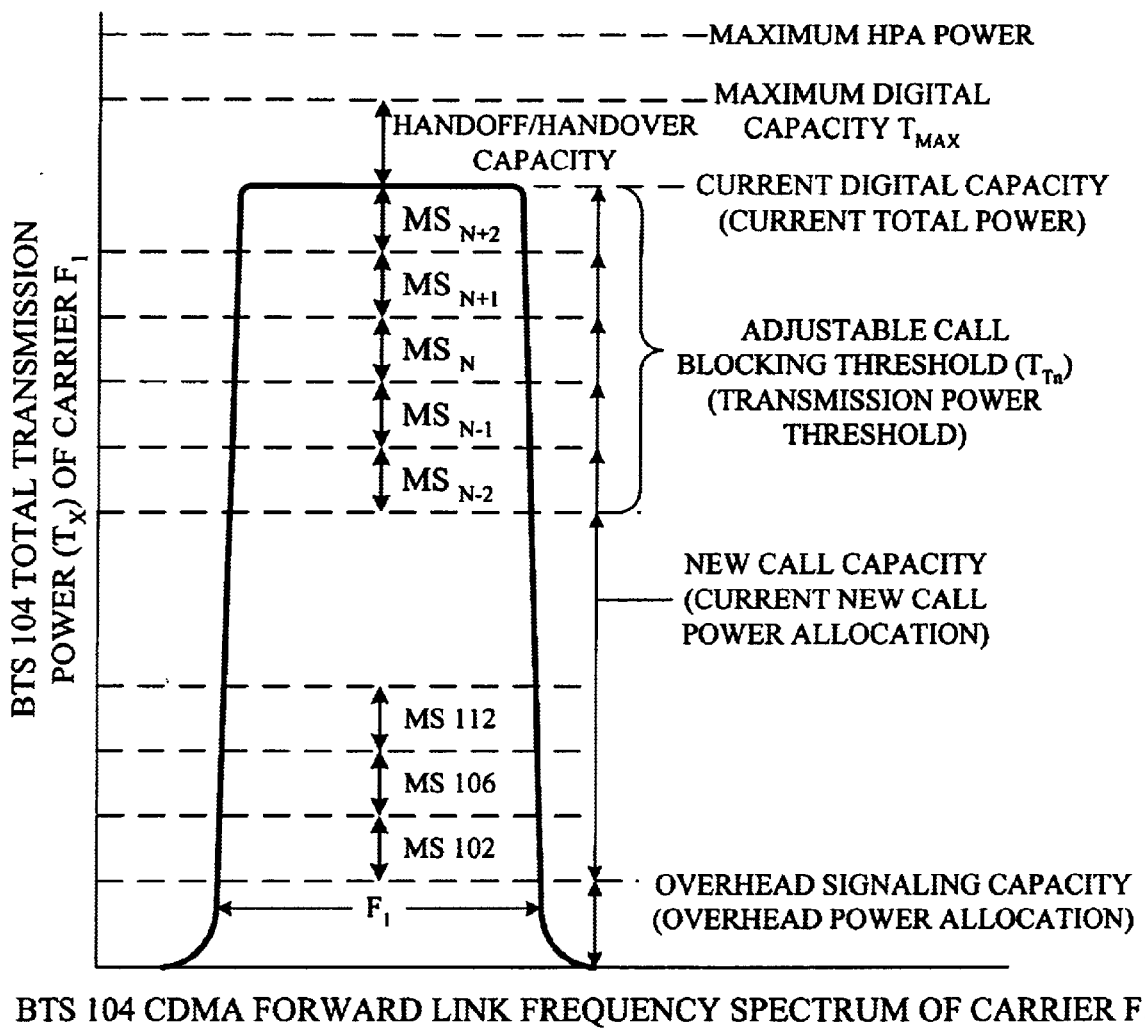
FIG. 3 is a graphic illustration of the total BTS transmission power ($T_x$) for a CDMA carrier $F_1$ and its adjustment and control in accordance with a preferred embodiment of the present invention.

Referring now to FIG. 3, shown is a graphic representation of the total radio frequency power transmitted by the BTS 104 over CDMA carrier $F_1$. Although FIG. 3 includes only carrier $F_1$, it will be apparent that this discussion of carrier $F_1$ would apply to other carriers over which BTS 104 transmits, such as $F_2$, $F_3$, $F_4$ through n carriers. The vertical axis of the graph represents the total power of the transmission at a given time, while the horizontal axis represents the breadth of frequencies comprising the carrier $F_1$.

The total transmission power $T_x$ is the sum of power allocated to $F_1$ carrier overhead (e.g. pilot, synchronization and paging signals), new calls, and combined soft handoffs and soft hand-overs. In general, the capacity of the carrier $F_1$ to handle each of the foregoing general categories of transmissions is directly related to the allocation of power to each. The BTS 104 is programmed or controlled to limit the total transmission power $T_x$ so as not to exceed the BTS 104 maximum high power amplifier (HPA) power rating. Thus, the total power $T_x$ and the corresponding capacity of the forward link comprising part of the $F_1$ carrier is limited by the maximum HPA power. In general, the total forward link power capacity available to BTS 104 for new calls and the combination of soft handoffs and soft hand-overs is that portion of the total power $T_x$ above the power allocation for overhead capacity and below the maximum HPA power. For this reason, BTS 104 is programmed or controlled with soft handoff and soft hand-over blocking threshold value $T_{max}$, set below the HPA maximum power, to block all additional soft handoffs and hand-overs that would cause $T_x$ to exceed that threshold. In addition, the $T_{max}$ threshold protects against power limiting of the HPA and the resulting sudden overall power decrease that would abruptly degrade both QOS and GOS if the maximum HPA power level were reached.

In general, the total transmission power $T_x$ of the carrier $F_1$ increases above the overhead transmission power as forward links are established with new calls, soft handoffs and soft hand-overs coming into the sector serviced by the BTS 104. As the number of calls serviced by BTS 104 increases, additional power is allocated to each forward link associated with each additional call. For example, referring specifically to both of FIGS. 2 and 3, additional power is allocated to each forward link transmission from BTS 104 to each of MSs 102,106 and 112 as a new call is established with each MS, whether originated by the BTS or the MS user. Additional power and capacity remains above the power level utilized in forward link transmissions to MSs 102,106 and 112 to handle forward links of soft handoffs and soft hand-overs into the sector serviced. The current digital capacity, in real-time, corresponds directly to the current total transmission power $T_x$ utilized at the time, and is limited to a maximum digital capacity corresponding to $T_{max}$.

A transmission power threshold $T_{Th}$ is used to control the amount of forward link transmission power allocated to new calls. The BTS 104 is programmed or controlled to block all new calls that would cause the total transmission power $T_x$ for all overhead signaling transmissions and new call forward link transmissions to exceed transmission power threshold $T_{Th}$. Hard hand-overs into the sector, which would require the forward and reverse links of an MS to migrate from an existing carrier $F_n$ to the new carrier $F_1$, are treated as new calls. All remaining capacity is therefore allocated to incoming soft handoffs and soft hand-overs. The number of new calls blocked corresponds directly to the GOS available within the sector. Field studies indicate that soft handoffs and soft hand-overs are rarely blocked. Also, variation of the blocking threshold $T_{max}$ has little or no apparent affect on the rate of soft handoff and soft hand-over blocking when it is set higher than a certain value. Therefore, adjustment of $T_{max}$ is assumed to have negligible impact on blocked soft handoffs and soft hand-overs. However, power and capacity available for soft handoffs and soft hand-overs does impact the forward bit error rate (FBER) and therefore the QOS. It is therefore preferable that the new call blocking transmission power threshold $T_{Th}$ is set to provide the desired GOS, while also providing as high a QOS as the remaining transmission power and capacity for soft handoffs and soft hand-overs will allow. Accomplishing this requires balancing the GOS and QOS, as user traffic demands A and user mobility h within the sector change.

This balance or optimization of GOS and QOS to accommodate changing traffic demands and user mobility is accomplished by adjusting the new call blocking threshold $T_{Th}$ with reference to monitored user traffic demand data and monitored user mobility data. Such data is preferably obtained from operational measurement (OM) data obtained in periodic intervals and stored within a base station controller (BTSC) 120 of network 100 by the BTS 104, associated MTX, or other network equipment. OM data is typically collected and stored for successive thirty (30) minute intervals. BTSC 120 OM data logs are preferably enhanced to provide OM data for each sector serviced by each associated BTS and to distinguish new call power requirements from soft handoff and hand-over requirements. Operational measurement data is available in wireless CDMA telecommunications networks, and captures both (i) the number of completed and the number of blocked (or dropped) new calls and (ii) the number of blocked and completed soft handoffs and soft hand-overs within each sector.

Adjustment of the new call blocking threshold $T_{Th}$ is accomplished by a method illustrated in FIGS. 3, 4, 5, and 6. The method is preferably controlled by either the BTS 104 or its associated BTSC 120. In general, the new call blocking threshold $T_{Th}$ of carrier $F_1$ of FIG. 3 transmitted by BTS 104 is adjusted in time intervals k, k+1, k+2, k+3, k+4 through k+n in FIG. 4, in accordance with the steps shown in FIGS. 5 and 6. The duration $\tau_k$, $\tau_{k+1}$, $\tau_{k+2}$, $\tau_{k+3}$, $\tau_{k+4}$ and $\tau_{k+n}$ of each of the respective time intervals is also adjusted in relation or with reference to the rates of change of new call traffic $\Delta A$ and user handoffs and hand-overs $\Delta h$, to increase and decrease the frequency of adjustment of the new call threshold $T_{Th}$ when respective higher and lower rates of change are experienced.

In step 510, operational measurement data for the preceding time interval (k), representing user traffic $A_k$ (successful and blocked new calls) and user mobility $h_k$ (successful and blocked soft handoffs and hand-overs) for time interval k (typically thirty minutes in duration), is obtained and stored for the sector. At step 520, a time interval designator or value is advanced to k+1, identifying the subsequent time interval. The OM data is then used in step 530 to determine an actual, measured new call blocking value PBD(k) corresponding to an actual, measured GOS value experienced within the sector during a first time interval (k).

From these values, in step 540, a value representing an expected new call blocking probability $PB_{(k+1)}$ and a corresponding, expected GOS for a second time interval (k+1), or other subsequent time interval, is derived. A relatively simple method of determining the $P_{BE(k+1)}$ value is to calculate a value representing a ratio of blocked new calls to total new calls requested, using operational measurement data for the sector measured and stored during the first time interval (k).

In step 550, a desired maximum call blocking value $P_{Bmax}$ for the subsequent time interval (k+1) stored in memory within the BTS 104, BTSC 120 or other associated network element, is accessed. For example, $P_{Bmax}$ could be set to a value corresponding to a blocking rate of 1%. This value is compared to the maximum new call blocking probability $P_{Bmax}$ and a corresponding target GOS desired for the sector subsequently, during the second time interval (k+1).

A determination of whether to adjust the forward link call blocking threshold $T_{Th}$ is then made with reference to the expected call blocking value $P_{BE(k+1)}$ (or directly to the OM data) and to the desired maximum call blocking value $P_{Bmax}$. If step 580 determines that the expected new call blocking probability $P_{BE(k+1)}$ and corresponding GOS) are less than $P_{Bmax}$ (and the corresponding target GOS), then the new call blocking power threshold $T_{Th}$ is increased in step 585. Conversely, if step 590 determines that the expected new call blocking probability $P_{BE(k+1)}$ (and corresponding GOS) are greater than $P_{Bmax}$ (and the corresponding target GOS), then the new call blocking power threshold $T_{Th}$ is decreased in step 595. Preferably, any increase or decrease in the threshold $T_{Th}$ is an incremental value corresponding to the average power allocation per new call experienced during the preceding time interval (k), stored with other OM data. Other incremental values could be selected and stored in memory as well or alternatively. It is expected that most adjustments will be of only one increment in amplitude. However, adjustments of multiple increments could also be made when traffic is increasing or decreasing rapidly.

By lowering the new call blocking threshold $T_{Th}$, in response to lower new call traffic demand A, greater capacity remains for incoming soft handoff and soft hand-over mobility h, thereby increasing the QOS of the sector and network 100. Similarly, by raising the new call blocking threshold $T_{Th}$ in response to greater new call traffic demand A, the probability of new calls being blocked is decreased, thereby enhancing the GOS.

An example of adjustment of the new call blocking threshold $T_{Th}$ for time interval (k+1), employing the method of steps 510 through 595 in FIG. 6, is graphically illustrated in FIG. 3. In the example shown, the threshold $T_{Th}$ is set to accommodate transmission power for forward links from BTS 104 to each of MSs 102,106,112, through n. Accordingly, the threshold $T_{Th}$ is set at a power level just above that needed to service the forward link of a new call between BTS 104 and MS n. Any additional new calls that would raise the combined power levels of all new calls and overhead signaling above the threshold $T_{Th}$ will be blocked.

The transmission power threshold $T_{Th}$ for the sector of BTS 104 serviced is raised or lowered in accordance with steps 510 through 595 to approach, if not match, the desired maximum call blocking probability $P_{Bmax}$ and corresponding target GOS for subsequent new calls. Thus, for example, increasing the power threshold $T_{Th}$ in anticipation of increasing new call traffic demand or decreasing user mobility allows BTS 104 additional capacity and power to provide forward links to new calls involving $MS_{n+1}$ and $MS_{n+2}$, which would otherwise be blocked if the threshold were fixed. Similarly, decreasing the power threshold $T_{Th}$ in anticipation of decreasing new call traffic demands or of increasing user mobility reduces unnecessary or undesired forward link capacity for $MS_n$, $MS_{n-1}$ and $MS_{n-2}$, while enhancing QOS for soft handoffs and soft hand-overs.

Figure 4:
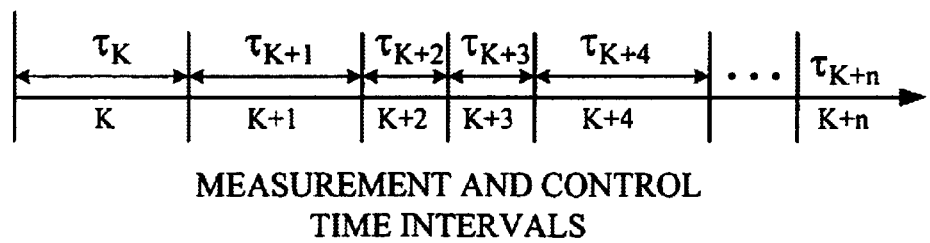
FIG. 4 is a graphic illustration of the total BTS transmission power ($T_x$) measurement and control time intervals k, k+1, k+2, k+3, k+4, through k+n of carrier $F_1$, in which the duration of the time intervals are varied in accordance with a preferred embodiment of the present invention.

FIGS. 4 and 6 illustrate the process by which successive intervals k+1, k+2, k+3, k+4 through k+n are adjusted in respective durations, $\tau_k$, $\tau_{k+1}$, $\tau_{k+2}$, $\tau_{k+3}$, $\tau_{k+4}$ through $\tau_{k+n}$. Variation or adjustment of the duration of each time interval correspondingly varies the frequency with which the call blocking threshold $T_{Th}$ is adjusted by the telecommunications network 100. The frequency of $T_{Th}$ adjustment is adjusted when OM data indicates in successive intervals that either user traffic A or user mobility h is varying beyond selected threshold rates $\Delta A_{max}$, $\Delta A_{min}$, $\Delta h_{max}$, or $\Delta h_{min}$.

In FIG. 4, the duration $\tau_{k+2}$ of time interval k+2 (the third of successive time intervals) is shown to be decreased in response to OM data indicating an increase in user or mobility traffic measured during preceding intervals k and k+1. Conversely, FIG. 4 illustrates an increase in the duration $\tau_{k+4}$ of time interval k+4 following reference in system 100 to OM data indicating that user traffic or mobility in preceding time intervals k+2 and k+3 decreased.

Figure 5:
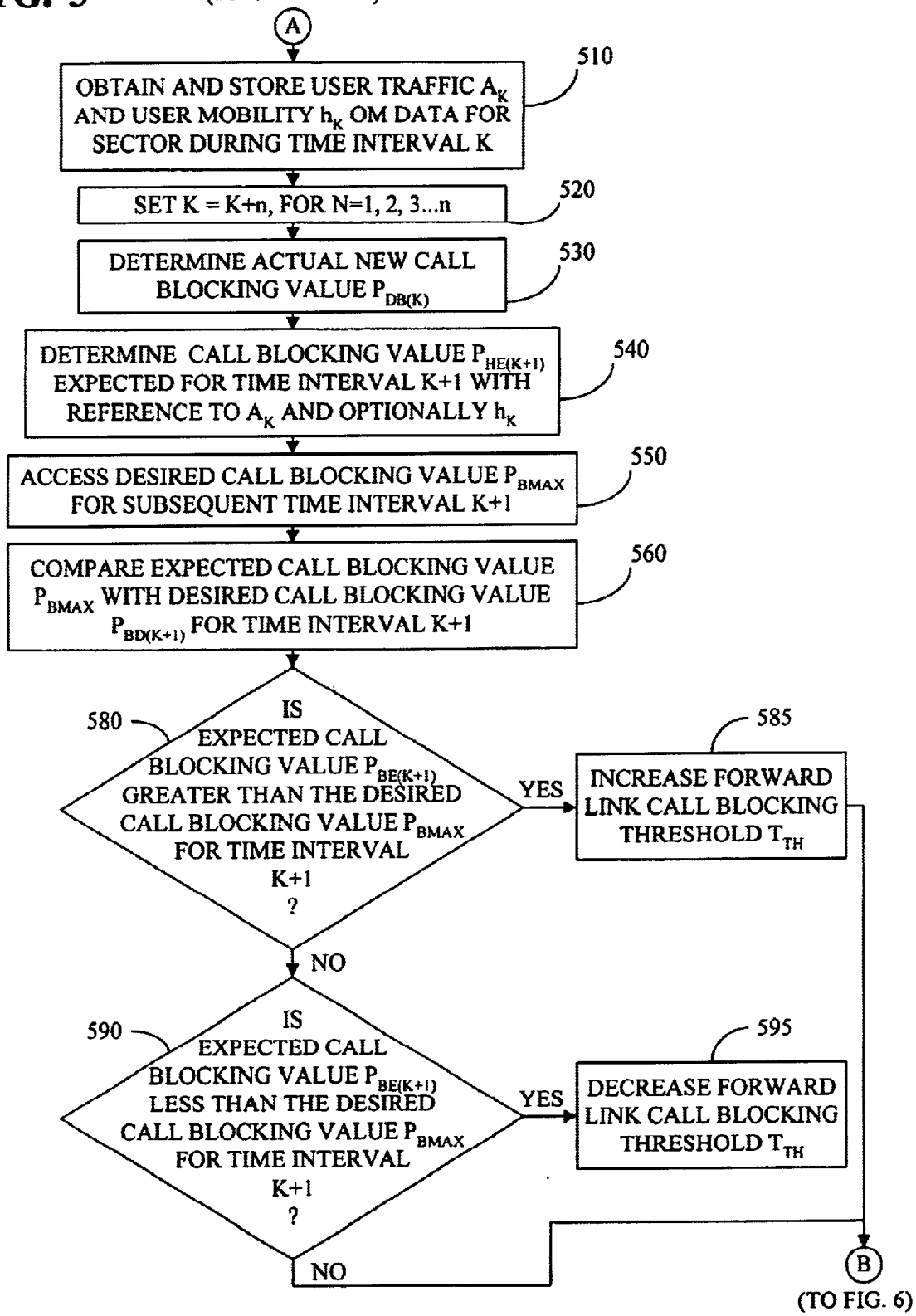
FIG. 5 is a flow diagram illustrating the method of a preferred embodiment of the present invention.

The process by which the duration of successive time intervals is adjusted begins following whichever of steps 585, 590 and 595 is last executed in FIG. 5. The time interval adjustment sequence begins with step 610 of FIG. 6, in which the absolute value, represented by $\Delta A$, of the difference in user traffic $\Delta A_{(k+1)}$ and $\Delta A_{(k)}$ during first and second time intervals k and k+1 is determined. Also determined in step 610 is the absolute value, represented by $\Delta h$, of the difference between user mobility $h_{(k)}$ and $h_{(k+1)}$ measured by OM data during successive time intervals A and k+1, respectively.

In step 620, parameters are set, representing thresholds or triggers for executing a variation in the duration of the next time interval. $\Delta h_{max}$ and $\Delta h_{min}$ represent the respective upper and lower limits of user mobility change ah determined in step 610 that must be met to trigger an adjustment in the duration of the next time interval. $\Delta A_{max}$ and $\Delta A_{min}$ represent the respective upper and lower limits of user traffic change $\Delta A$ determined in step 610 that must be met to trigger an adjustment in the duration of the next time interval. In the example shown, the next time interval adjusted is $\tau_{k+2}$ of time interval k+2, the third of three successive intervals.

A determination is made of whether to adjust the duration $\tau_{k+2}$ of the next time interval k+2 in steps 630 and 640. In step 630, a determination is made of whether $\Delta A$ and $\Delta h$ are greater than $\Delta A_{max}$ or $\Delta h_{max}$, respectively. If either condition is satisfied, then the duration $\tau_{k+2}$ is decreased in accordance with step 650. If neither condition is satisfied, then the process moves to step 640, in which a determination is made of whether $\Delta A$ and $\Delta h$ are less than $\Delta A_{min}$ or $\Delta h_{min}$, respectively. If either condition is satisfied, then the duration $\tau_{k+2}$ is increased in accordance with step 660. However, if neither condition of step 640 is met, then the duration $\tau_{k+2}$ is set equal to the duration $\tau_{k+1}$, in accordance with step 670.

Steps 650, 660 and 670 operate to decrease, increase or maintain substantially constant the duration $\tau$ of the next successive time interval for the call blocking threshold $T_{Th}$, respectively. In step 650, the duration $\tau_{k+2}$ is set at a value that is the greater of (i) one-half the value of the duration $\tau_{k+1}$ and (ii) the duration ($\tau$OM) of the time interval in which OM data is collected (typically thirty minutes). In step 660, the duration $\tau_{k+2}$ is set equal to twice the value of the duration $\tau_{k+1}$. In step 670, the duration $\tau_{k+2}$ is set equal to the value of the duration $\tau_{k+1}$. Following completion of whichever of steps 650, 660 and 670 is applicable, the process returns to step 510.

The process steps illustrated in FIGS. 3, 4, 5, and 6 are reiterated for successive time intervals k, k+1, k+2, k+3, k+4 through k+n, representing successive time intervals throughout an extended period of network 100 and BTS 104 operation. This iterative process is used to replace the conventional method of determining a fixed call blocking threshold $T_{Th}$. The method disclosed provides an accurate, dynamic and effective method to adjust the call blocking threshold $T_{Th}$ according to and with reference to variations of traffic and mobility, thus optimizing GOS and QOS of the CDMA network 100 and other spread-spectrum carrier telecommunications systems.

Although the invention has been described with reference to specific CDMA system embodiments, these descriptions are not meant to be construed in a limiting sense. Various modifications of the disclosed embodiments, as well as alternative embodiments of the invention, will become apparent to persons skilled in the art upon reference to the description of the invention. It is, therefore, contemplated that the claims will cover any such modifications or embodiments that fall within the true scope and spirit of the invention.

What is claimed is:

1. A method of enhancing the grade of service of one or more CDMA wireless links in a wireless telecommunications system, comprising:

determining the total transmission power $T_x$ of one or more wireless transmission forward links;

setting a transmission power $T_x$ threshold $T_{Th}$ for new calls transmitted on one or more of the forward links;

blocking one or more new calls directed to one or more of the forward links of the total transmission power $T_x$ from exceeding the transmission power threshold $T_{Th}$;

selecting one or more desired maximum new call blocking probabilities $P_{Bmax}$ for one or more of the forward links; and adjusting the transmission power threshold $T_{Th}$ for one or more of the forward links to correspond to the desired maximum new call blocking probability $P_{Bmax}$.

2. The method of claim 1, further comprising:
determining the user mobility h within one or more sectors serviced by one or more forward links; and
wherein the step of adjusting the transmission power threshold $T_{Th}$ for one or more forward links is completed with reference to both new call traffic and the user mobility h within one or more sectors serviced by one or more of the forward links.

3. The method of claim 1, wherein the step of adjusting the transmission power threshold $T_{Th}$ is completed with reference to operational measurement data for one or more sectors serviced by one or more of the forward links.

4. The method of claim 2, wherein the step of adjusting the transmission power threshold $T_{Th}$ for one or more forward links is completed with reference to operational measurement data for one or more sectors serviced by one or more of the forward links.

5. The method of claim 1, further comprising:
determining the number of new calls blocked for one or more of the forward links during a preceding time interval;
estimating the new call blocking probability $P_{B(k+1)}$ for one or more of the forward links for a subsequent time interval with reference to the number of new calls blocked during the preceding time interval; and
adjusting the transmission power threshold $T_{Th}$ for one or more of the forward links if the estimated new call blocking probability $P_{B(k+1)}$ is not equivalent to the desired maximum new call blocking probability $P_{Bmax}$.

6. The method of claim 2, further comprising:
determining the mobility of users for one or more sectors serviced by one or more of the forward links during a preceding time interval;
estimating the user mobility for one or more sectors serviced by one or more of the forward links for a subsequent time interval with reference to the user mobility determined for the preceding time interval; and
adjusting the transmission power threshold $T_{Th}$ for one or more of the forward links. with reference, at least in part, to the user mobility estimated for the subsequent time interval.

7. The method of claim 1, further comprising:
determining a new call blocking value representing the portion of new calls blocked from transmission over one or more of the forward links in a prior time interval;
comparing the determined new call blocking value to the desired maximum new call blocking probability $P_{Bmax}$; and
adjusting the transmission power $T_x$ threshold $T_{Th}$ of one or more of the forward links in relation to whether the determined new call blocking value is less than or greater than the desired maximum new call blocking probability.

8. The method of claim 2, further comprising:
determining a user mobility h value representing at least in part the number of handoffs or hand-overs in one or more sectors serviced by one or more of the forward links in a prior time interval; and
adjusting the transmission power $T_x$ threshold $T_{Th}$ of one or more of the forward links in relation to the determined mobility value h.

9. The method of claim 7, further comprising:
monitoring user traffic in one or more sectors serviced by one or more of the forward links; and
varying the frequency of adjusting the transmission power $T_x$ threshold $T_{Th}$ of one or more of the forward links servicing one or more of the monitored sectors in relation to whether the monitored user traffic is increasing or decreasing.

10. The method of claim 8, further comprising varying the frequency of adjusting the transmission power $T_x$ threshold $T_{Th}$ of one or more of the forward links in relation to whether the monitored user mobility h is increasing or decreasing.

11. The method of claim 9, further comprising varying the frequency of adjusting the transmission power $T_x$ threshold $T_{Th}$ of one or more of the forward links with reference to one or both of an upper and lower threshold rate of change in the monitored user traffic.

12. The method of claim 10, further comprising varying the frequency of adjusting the transmission power $T_x$ threshold $T_{Th}$ of one or more of the forward links with reference to one or both of an upper and lower threshold rate of change in the monitored user mobility.

13. The method of claim 7, further comprising:
collecting and storing in memory operational measurement data including representations of new calls blocked from transmission on one or more of the forward links; and
wherein the new call blocking value is determined with reference to the operational measurement data.

14. The method of claim 8, further comprising:
collecting and storing in memory operational measurement data including representations of user mobility within one or more sectors serviced by one or more of the forward links; and
wherein the user mobility h value is determined with reference to the operational measurement data.

15. The method of claim 13, wherein the operational measurement data is collected and stored for a time interval and wherein the new call blocking value is determined from a prior time interval in which the operational measurement data is collected and stored.

16. The method of claim 14, wherein the operational measurement data is collected and stored for a time interval and wherein the user mobility h value is determined from a prior time interval in which the operational measurement data is collected and stored.

17. A system for enhancing the grade of service of one or more CDMA wireless links in a wireless telecommunications system, comprising:
monitoring means for determining the total transmission power $T_x$ of one or more wireless transmission forward links;
means for setting a transmission power $T_x$ threshold $T_{Th}$ for new calls transmitted on one or more of the forward links;
means for blocking one or more new calls directed to one or more of the forward links if the total transmission power $T_x$ exceeds the transmission power threshold $T_{Th}$;
means for establishing one or more desired maximum new call blocking probabilities $P_{Bmax}$ for one or more of the forward links; and
means for adjusting the transmission power threshold $T_{Th}$ for one or more of the forward links in relation to the desired maximum new call blocking probability $P_{Bmax}$.

18. The system of claim 17, further comprising:
means for determining the user mobility h within one or more sectors serviced by one or more forward links; and wherein the means for adjusting the transmission power threshold $T_{Th}$ for one or more forward links completes the adjustment with reference to both new call traffic and the user mobility h within one or more sectors serviced by one or more of the forward links.

19. The system of claim 17, wherein the means for adjusting the transmission power threshold $T_{Th}$ completes the adjustment with reference to operational measurement data for one or more sectors serviced by one or more of the forward links.

20. The system of claim 18, further comprising means for adjusting the transmission power threshold $T_{Th}$ for one or more forward links with reference to operational measurement data for one or more sectors serviced by one or more of the forward links.

21. The system of claim 17, further comprising:
means for determining the number of new calls blocked for one or more of the forward links during a preceding time interval;
means for estimating the new call blocking probability $P_{B(k+1)}$ for one or more of the forward links for a subsequent time interval with reference to the number of new calls blocked during the preceding time interval; and
means for adjusting the transmission power threshold $T_{Th}$ for one or more of the forward links if the estimated new call blocking probability $P_{B(k+}1)$ is not equivalent to the desired maximum new call blocking probability $P_{Bmax}$.

22. The system of claim 18, further comprising:
means for determining the mobility of users for one or more sectors serviced by one or more of the forward links during a preceding time interval;
means for estimating the user mobility for one or more sectors serviced by one or more of the forward links for a subsequent time interval with reference to the user mobility determined for the preceding time interval; and
means for adjusting the transmission power threshold $T_{Th}$ for one or more of the forward links with reference at least in part to the user mobility estimated for the subsequent time interval.

23. The system of claim 17, further comprising:
means for determining a new call blocking value representing the portion of new calls blocked from transmission over one or more of the forward links in a prior time interval;
means for comparing the determined new call blocking value to the desired maximum new call blocking probability $P_{Bmax}$; and
means for adjusting the transmission power $T_x$ threshold $T_{Th}$ of one or more of the forward links in relation to whether the determined new call blocking value is less than or greater than the desired maximum new call blocking probability.

24. The system of claim 18, further comprising:
means for determining a user mobility h value representing at least in part the number of handoffs or hand-overs in one or more sectors serviced by one or more of the forward links in a prior time interval; and
means for adjusting the transmission power $T_x$ threshold $T_{Th}$ of one or more of the forward links in relation to the determined mobility value h.

25. The system of claim 23, further comprising:
means for monitoring user traffic in one or more sectors serviced by one or more of the forward links; and
means for varying the frequency of adjusting the transmission power $T_x$ threshold $T_{Th}$ of one or more of the forward links servicing one or more of the monitored sectors in relation to whether the monitored user traffic is increasing or decreasing.

26. The system of claim 24, further comprising means for varying the frequency of adjusting the transmission power $T_x$ threshold $T_{Th}$ of one or more of the forward links in relation to whether the monitored user mobility h is increasing or decreasing.

27. The system of claim 25, further comprising means for varying the frequency of adjusting the transmission power $T_x$ threshold $T_{Th}$ of one or more of the forward links with reference to one or both of an upper and lower threshold rate of change in the monitored user traffic.

28. The system of claim 26, further comprising means for varying the frequency of adjusting the transmission power $T_x$ threshold $T_{Th}$ of one or more of the forward links with reference to one or both of an upper and lower threshold rate of change in the monitored user mobility.

29. The system of claim 23, further comprising:
means for collecting and storing in memory operational measurement data including representations of new calls blocked from transmission on one or more of the forward links; and
means for determining the new call blocking value with reference to the operational measurement data.

30. The system of claim 24, further comprising:
means for collecting and storing in memory operational measurement data including representations of user mobility within one or more sectors serviced by one or more of the forward links; and
means for determining the user mobility h value is determined with reference to the operational measurement data.

31. The system of claim 29, wherein the operational measurement data is collected and stored by the data collecting and storing means for a time interval and wherein the new call blocking value is determined by the new call blocking value determining means from a prior time interval in which the operational measurement data is collected and stored.

32. The system of claim 30, wherein the operational measurement data is collected and stored by the data collecting and storing means for a time interval and wherein the user mobility h value is determined by the user mobility value determining means from a prior time interval in which the operational measurement data is collected and stored.

33. A method of adjusting the call blocking threshold of a forward link of a wireless telecommunications system, comprising:
determining a measured call blocking value related to a ratio of a number of calls made to a number of blocked calls on the forward link during one or more time intervals;
selecting a desired call blocking value representing a desired ratio of a number of calls made to a number of calls blocked on the forward link;
comparing the measured call blocking value to the desired call blocking value; and
adjusting the call blocking threshold of the forward link in relation to the comparison of the measured call blocking value and the desired call blocking value.

34. The method of claim 33, wherein the measured call blocking value is used to determine a measured grade of service value for one or more of the time intervals, the desired call blocking value is used to determine a desired grade of service, and the call blocking threshold is adjusted in relation to a comparison of the measured grade of service and the desired grade of service.

35. A method of setting a call blocking threshold of a CDMA forward link in a wireless telecommunications system, comprising:

(a) setting the call blocking threshold of the forward link at a first value during a first time interval;

(b) selecting a target grade of service for the forward link;

(c) obtaining and storing user traffic data and user mobility data during at least a portion of the first time interval for a sector serviced by the forward link;

(d) determining an actual grade of service for the forward link from the user traffic data and user mobility data during the first time interval;

(e) updating the call blocking threshold of the forward link for a second subsequent time interval to a second value that is lower than the first value if the actual grade of service exceeds the selected target grade of service and to a second value that is higher than the first value if the actual grade of service is less than the selected target grade of service;

(f) obtaining and storing user traffic data and user mobility data during at least a portion of the second time interval for the sector serviced by the forward link; and (g) adjusting the duration of the second time interval if either or both of the user traffic data and user mobility data obtained during one or more preceding time intervals indicates an increase or decrease in the user traffic or user mobility.

36. The method of claim 35, wherein the user traffic data and the user mobility data are obtained with reference to operational measurement data.

37. The method of claim 35, further comprising:

a third time interval during which user traffic and user mobility data are obtained and stored; and wherein the third time interval is adjusted in relation to whether either or both of the user traffic data and the user mobility data obtained for the first and second time intervals indicate an increase or decrease in user traffic or user mobility within the sector.

38. The method of claim 37, further comprising:

deriving user traffic data and user mobility data during at least a portion of the second time interval; and wherein the third time interval is adjusted in relation to whether either or both of the user traffic data or the user mobility data indicates an increase or decrease in user traffic or user mobility within the sector during the second time interval as compared to the first time interval.

39. The method of claim 38, further comprising:

selecting a threshold value of user traffic rate change $\Delta A_{max}$;

determining the absolute value $|\Delta A_{1,2}|$ of the difference between user traffic for the sector during the first and second time intervals; and decreasing the duration of the third time interval if the value $|\Delta A_{1,2}|$ is greater than the user traffic rate change threshold $\Delta A_{max}$.

40. The method of claim 38 or 39, further comprising:

selecting a threshold value of user traffic rate change $\Delta A_{min}$;

determining the absolute value of the difference between user traffic $|\Delta A_{1,2}|$ for the sector during the first and second time intervals; and increasing the duration of the third time interval if the value $|\Delta A_{1,2}|$ is less than the user traffic rate change threshold $\Delta A_{min}$.

41. The method of claim 38, further comprising:

selecting a threshold value of user mobility rate change $\Delta h_{max}$;

determining the absolute value of the difference between user mobility $|\Delta h_{1,2}|$ for the sector during the first and second time intervals; and decreasing the duration of the third time interval if the value $|\Delta h_{1,2}|$ is greater than the user traffic rate change threshold $\Delta h_{max}$.

42. The method of claim 38 or 41, further comprising: selecting a threshold value of user mobility rate change $\Delta h_{min}$; determining the absolute value of the difference between user mobility $|\Delta h_{1,2}|$ for the sector during the first and second time intervals; and increasing the duration of the third time interval if the value $|\Delta h_{1,2}|$ is less than the user traffic rate change threshold $\Delta h_{min}$.

* * * * *

UNITED STATES PATENT AND TRADEMARK OFFICE
CERTIFICATE OF CORRECTION

PATENT NO. : 6,628,637 B1
DATED : September 30, 2003
INVENTOR(S) : Huan Li et al.

It is certified that error appears in the above-identified patent and that said Letters Patent is hereby corrected as shown below:

Column 7,
Line 55, please insert a space between "k+1" and "is".

Column 9,
Line 41, after "links" please delete ".".

Column 14,
Line 39, please insert a hard return before "determining".

Signed and Sealed this

Sixth Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,628,637 B1
DATED : September 30, 2003
INVENTOR(S) : Huan Li and Ping Yang It is certified that error appears in the above-identified patent and that said Letters Patent is hereby corrected as shown below:

Column 6,
Line 21, delete "PBD(k)" and insert -- $P_{BD(k)}$ --

Column 11,
Line 27, delete "$P_B(_{k+}1)$" and insert -- $P_{B(k+1)}$ --

Signed and Sealed this

Twelfth Day of October, 2004

JON W. DUDAS
*Director of the United States Patent and Trademark Office*